Patented Sept. 12, 1950

2,522,212

UNITED STATES PATENT OFFICE 2,522,212

CONCENTRATION OF AQUEOUS SOLUTIONS OF HYDROCARBON SULFATES AND SULFONATES

Hendrik Frederik Dammers, Amsterdam, Netherlands, assignor to Shell Development Company, San Francisco, Calif., a corporation of Delaware No Drawing. Application December 13, 1947, Serial No. 791,658. In the Netherlands December 19, 1946

9 Claims. (Cl. 260—459)

1

This invention relates to an improved method for the production of concentrated solutions of surface-active agents from less concentrated aqueous solutions thereof. It deals particularly with a more economical method of concentrating aqueous solutions of hydrophilic water-soluble salts of organic acids having a hydrocarbon radical of 8 to 25 carbon atoms per molecule and a —SO$_3$H group which is directly linked to a carbon atom of the hydrocarbon radical as in the sulfonic acid or is attached to an oxygen atom which is directly linked to a carbon atom of the hydrocarbon radical as in sulfuric acid esters. These salts will be generically referred to hereinafter as sulfonate salts.

Many different types of sulfonate salts have found use as detergents, degreasing, wetting and emulsifying agents. Primary alkyl sulfate salts, for example, are produced by sulfating fatty alcohols such as may be produced by hydrogenation of the corresponding fatty acids or the higher alcohols obtained by the Oxo synthesis process and neutralizing the product. Secondary and tertiary alkyl sulfate salts are obtained by neutralizing sulfation products of alkenes of at least six carbon atoms per molecule or the corresponding alcohols. U. S. Patents 1,968,794 and 2,139,393, for instance, describe suitable methods for producing alkyl sulfate salts which are suitable starting materials for the process of the present invention. Saponification of sulfo-chlorination products of saturated hydrocarbons of six or more carbon atoms per molecule as described, for example, in U. S. Patent 2,276,090 is used to produce aqueous solutions of salts of alkyl sulfonic acids which may likewise be used, as may also the soluble salts of alkylated aromatic sulfonic acids such as described in U. S. Patent 2,283,199.

As normally produced, all of these sulfonate salts are obtained as relatively dilute aqueous solutions of, for example, about 10% to 25% concentration. In order to obtain the sulfonate salts in more concentrated form, it has been customary to evaporate off the water present, for instance, by spray drying as described in U. S. Patents 2,047,612 and 2,298,650. This procedure is, however, quite expensive due to the cost of the apparatus required and the large amount of heat consumed.

Sulfonate salts may also be recovered from their aqueous solutions by extraction with organic solvents, but, with the sulfonate salt solutions with which the present invention is concerned and which contain relatively little inorganic salt, e. g. less than 10% by weight, large amounts of solvent, at least 50% or more calculated on the initial solution, are required and the solvent must be distilled off from the extract in order to obtain any effective concentration of the sulfonate salt. The removal of solvent has to be very carefully controlled to avoid decomposition which causes discoloration of the final product. I have also investigated the recovery of sulfonate salts by salting out with added inorganic salts but this method also is not satisfactory because the ester salts and sulfonic acid salts remain peptized in the solution in finely dispersed form so that an effective separation does not take place.

An important object of the present invention is to provide a method for concentrating aqueous solutions of sulfonate salts which avoids the drawbacks of the above-described methods. Another object is to provide a simple and economical method of concentrating sulfonate salt solutions of 25% concentration or less without distillation or evaporation expense. A special object is to produce concentrated products suitable for immediate direct use as washing, degreasing, wetting or emulsifying agents from less concentrated aqueous sulfonate salt solutions. Still another object is to enhance the capillary-active properties of sulfonate salts while simultaneously concentrating them. Further objects and advantages of the process will be apparent from the following description of the invention.

The present invention is based upon the remarkable discovery that in applying a salting-out treatment to sulfonate salt solutions it is possible to separate the sulfonate salt in a concentrated form if, at the same time, a small amount, i. e. from 3% to 10% by weight calculated on the initial solution, of an organic solvent which contains a polar group and is insoluble or substantially insoluble in the salt solution is added.

The process according to the invention comprises the addition to the initial dilute aqueous solution of the sulfonate salt of a water-soluble inorganic salt and a small quantity (at most, about 10% by weight calculated on the initial solution) of a polar organic solvent for the sulfonate salt, which solvent is substantially insoluble in the salt solution, and separating from each other the two layers into which the mixture is thus split up. The order in which the inorganic salt and solvent are added is not important in the process. The upper layer which is formed consists of the desired concentrated product containing, for example, 40% to 50% or more by weight of sulfuric acid ester salt or sulfonic acid salt, together with the polar organic solvent employed. The other layer of the stratified mixture is an aqueous inorganic salt solution in which the sulfonate salt and solvent content are practically negligible.

Any water-soluble inorganic salt may be used for the salting out operation of the process but for purposes of economy the cheaper inorganic salts, such as sodium chloride, sodium carbonate, sodium sulfate, calcium chloride and the like, are preferred. However, corresponding water-soluble salts of other alkali or alkaline earth metals may be used, as may also other salts such as nitrates, phosphates including the polyphosphates, etc., borates, etc., of the same or other metals.

The quantity of salt used in the process according to the invention varies with the composition of the initial solution; this quantity generally increases as the concentration of active substance in this solution decreases. Starting from ester salt solutions of about 20% to 25%, additions of about 15% common salt or some other salt, such as sodium sulfate or sodium nitrate or the corresponding potassium salts, are sufficient for the object in view; however, if desired, larger quantities, e. g. sufficient to saturate the solution, may be added.

The sulfonate salt solutions treated according to the invention may contain, usually in small amounts, inorganic salts, for example, inorganic sulfates originating from the neutralization of excess sulfuric acid remaining after sulfonating or sulfating in the course of manufacture of the sulfonate salt or inorganic chlorides formed in the saponification of sulfo-chlorides, or present from some other source. These inorganic salts will be found chiefly in the aqueous phase of the stratified product according to the process of the invention which thus has the additional advantage of producing concentrated sulfonate salts which are quite pure with respect to inorganic salt content. Furthermore, the presence of inorganic salts in the initial dilute solution will reduce the quantity of inorganic salt which has to be added for the salting out operation. Thus, when the process is applied to solutions of sulfonic acid salts, for example, alkyl aryl sulfonic acid salts or products of saponification of sulfonic acid chlorides, which solutions already contain considerable amounts of inorganic sulfates or chlorides, the addition of smaller amounts of inorganic salt than is necessary when treating purer sulfonate salts is usually sufficient.

A wide variety of polar organic solvents may be used in the process. These include the substantially water-insoluble alcohols, ketones, aldehydes and amines which boil above about 100° C. and are liquid under the operating conditions. The aliphatic and cyclic alcohols of six or more carbon atoms per molecule are especially advantageous polar organic solvents for use in the process because they enhance the capillary activity of the concentrated sulfonate salt product. Examples of such preferred solvents are, for instance, cyclohexanol, methyl cyclohexanol, methyl isobutyl carbinol, heptanol-2, 6-methyl heptanol-3, etc. However, other solvents such, for instance, as normal amyl alcohol, benzyl alcohol, methyl isobutyl ketone, methyl normal butyl ketone, diisobutyl ketone, mesityl oxide, isophorone, valeraldehyde, isobutylacetaldehyde, oenanthyl aldehyde, di-normal propyl carbylamine, normal heptyl amine, di-normal butyl amine, dimethyl heptyl amine, etc., can likewise be used. Individual polar organic solvents or mixtures of two or more such solvents may be used and, if desired, may be employed in combination with non-polar liquids such as hydrocarbons. It is desirable, however, that water-soluble solvents be absent as they introduce complications in the process.

As previously pointed out, the amount of polar organic solvent to be used in any case is not more than about 10% by weight of the initial sulfonate salt solution treated. In general, considerably smaller quantities of solvent, for example, amounts of the order of about 5%, are sufficient to effect the desired separation and are preferred.

The process of the invention is preferably carried out at elevated temperature, preferably at a temperature of 50° C. to about 100° C., as the separation into layers is found to take place more readily in this range. It is advantageous to add the required amount of the chosen inorganic salt to the solution to be concentrated, which has been heated to the chosen elevated temperature, for example, 100° C., and then add the polar organic solvent, whereupon the separation of the mixture into layers will be found to take place. However, the heating and mixing with inorganic salt and polar solvent may be carried out in any other order desired.

The concentrated products, in their preferred form, have, at ordinary temperatures, generally the consistency of a paste and may be used directly for washing, degreasing, wetting and emulsifying purposes without removal of the solvent or any other treatment. They have been found to be particularly suitable for immediate use in washing and wetting fabrics or metal objects and are especially effective in cleaning those soiled with oily dirt and the like. The products of the invention also have the advantage of forming dilute solutions which are stable at low temperatures. Thus, a concentrated alkyl sulfate salt solution, for example, prepared according to the invention and then diluted with water to about 20% concentration, is appreciably more stable at low temperature than a corresponding technical alkyl sulfate salt solution of the same concentration and containing the same amount of cyclohexanol or similar organic solvent. The technical alkyl sulfate solution tends to deposit inorganic salts at low temperatures, whereas the product of the process of the invention does not have this disadvantage and is therefore much easier to handle and apply.

The following examples illustrate typical methods of carrying out the process of the invention and show some of its advantages.

*Example I*

Fifteen parts by weight common salt were added at a temperature of 90° C. to 100° C. to 100 parts by weight of a technical ester salt solution, which had been prepared from a sulfation product of a $C_{10}$–$C_{18}$ alkene fraction and contained about 21% by weight sodium alkyl sulfate and about 7% by weight sodium sulfate. The solution became only slightly clouded.

Subsequently about 5 parts by weight cyclohexanol were added to the solution at the same temperature, upon which two layers were formed, which were separated from each other. The upper layer, which upon being cooled down to room temperature had the consistency of a paste, contained about 50% by weight ester salt and further water, the cyclohexanol used, and a small quantity of inorganic salt, while the bottom layer consisted of an aqueous solution of sodium sulfate and common salt, which contained only a few hundredths per cent ester salt. This bottom layer could be evaporated, upon which the salt mixture obtained could be used for salting out a fresh quantity of ester salt solution in accordance with the invention.

If the cyclohexanol alone was added, the ester salt solution remained perfectly homogeneous.

When an equal quantity of methyl isobutyl carbinol was used instead of cyclohexanol, an analogous result was obtained, which was also the case if sodium sulfate was used instead of common salt.

The concentrated ester salt paste thus obtained was eminently suitable for immediate use as washing, cleaning and wetting agent.

*Example II*

About 15 parts by weight common salt were added at a temperature of 90° C. to 100° C. to 100 parts by weight of a technical sulfonate solution, which had been prepared by sulfo-chlorination of a gas-oil fraction boiling between 280° C. and 380° C., which had been dearomatized by refining and subsequent saponification with NaOH, and which contained 20% by weight Na-alkyl sulfonate and about 7% by weight common salt. No striking alteration of the appearance of the liquid occurred. Then the solution was mixed at the same temperature with about 5 parts by weight cyclohexanol, upon which a very pronounced separation took place. The upper layer, which after cooling had the consistency of a paste, contained about 40% by weight sodium alkyl sulfonate and further water, common salt, and the cyclohexanol used, while the bottom layer consisted of an aqueous solution of common salt, which practically contained no more sodium alkyl sulfonate.

The sodium alkyl sulfonate paste thus obtained was eminently suitable to be used for washing, cleaning and wetting purposes.

*Example III*

Using the same procedure as in the preceding examples, a 22% solution of dodecyl toluene sodium sulfonate produced by sulfonating and neutralizing the product of alkylating toluene with propylene tetramers and containing about 11% by weight of sodium sulfate, treated with 10 parts of sodium sulfate and 6 parts of octyl alcohol, gives an upper layer which on cooling is a paste substantially free from inorganic salts and containing practically all of the dodecyl toluene sodium sulfonate in a concentration of about 40% to 50%. This paste has excellent detergent properties.

The same results are obtained when dodecyl benzene sulfonic acid sodium salt is used in place of the dodecyl toluene sodium sulfonate.

It will be seen that the process of the invention offers many advantages over prior methods of concentrating sulfonate salt solutions and that it is capable of wide variation not only with respect to the type of sulfonate salts which may be treated and the polar organic solvents and inorganic salts which may be employed to effect the salting out operation, but also with respect to the procedures which may be used in carrying out the new process. It will therefore be understood that the invention is not limited to the examples which are given by way of illustration only nor by any theory proposed in explanation of the improved results which are obtained.

I claim as my invention:

1. A process for the production of a concentrated solution of a surface-active salt of an organic acid having a —$SO_3H$ group linked to a hydrocarbon radical of 8 to 25 carbon atoms per molecule from less concentrated aqueous solutions thereof substantially free from inorganic salts which comprises salting out said surface-active salt from the less concentrated substantially inorganic salt-free solution by addition of a water-soluble inorganic salt and from 3% to not more than 10% by weight based on said less concentrated solution of a polar organic solvent for said surface-active salt, which solvent has a boiling point above 100° C., is liquid under the operating conditions, and is substantially insoluble in the solution of said inorganic salt, separating the resulting phases, and recovering a concentrated solution of the surface-active salt of said organic acid containing said polar organic solvent.

2. A process for the production of a concentrated solution suitable for direct use as a washing, wetting or emulsifying agent from a less concentrated substantially inorganic salt-free aqueous solution of a surface-active salt of an organic acid having a —$SO_3H$ group linked to a hydrocarbon radical of 8 to 25 carbon atoms per molecule which comprises treating said less concentrated substantially inorganic salt-free aqueous solution with from 3% to not more than 10% by weight based on said less concentrated solution of a saturated monohydric alcohol boiling above 100° C., which solvent is liquid under the operating conditions and is substantially insoluble in the solution of said inorganic salt, in the presence of sufficient of a water-soluble inorganic salt to cause separation of the mixture into two liquid phases at a temperature of at least 50° C. but below the boiling temperature of said alcohol, and separating the resulting phases to recover a concentrated solution of the surface-active salt containing said alcohol.

3. A process for the production of a concentrated solution of a surface-active salt of an organic acid having a —$SO_3H$ group linked to a hydrocarbon radical of 8 to 25 carbon atoms per molecule from less concentrated substantially inorganic salt-free aqueous solutions thereof which comprises adding to an aqueous substantially inorganic salt-free solution of said surface-active salt of about 10% to about 25% concentration from 3% to 10% by weight of a liquid saturated monohydric alcohol of 6 to 8 carbon atoms per molecule and sufficient of a water-soluble inorganic salt to cause separation of the mixture into two liquid phases, stratifying said phases and separating a solution of said surface-active salt containing said alcohol and having at least 40% concentration from an aqueous solution of said inorganic salt.

4. A process for concentrating an aqueous solution of a water-soluble salt of an alkyl acid sulfate having 8 to 25 carbon atoms per molecule of not more than 25% concentration substantially free from inorganic salts which comprises salting out said alkyl sulfate salt from said substantially inorganic salt-free solution by adding thereto a water-soluble alkali metal salt of an inorganic acid and from 3% to 10% by weight based on said solution of a polar organic solvent for said alkyl sulfate salt, which solvent has a boiling point above 100° C., is liquid under the operating conditions, and is substantially insoluble in the solution of said alkali metal salt, maintaining the mixture at a temperature of 50° C. to 100° C., and separating the resulting liquid phases to recover a more concentrated solution of the alkyl sulfate salt containing said polar organic solvent.

5. A process for concentrating an aqueous solution of a sodium salt of a secondary alkyl acid sulfate of 10 to 18 carbon atoms per molecule of 10% to 25% concentration which is substantially free from inorganic salts which comprises adding to said substantially inorganic salt-free solution about 15% by weight of sodium chloride and about 5% by weight of a saturated monohydroxy-substituted hydrocarbon having 6 carbon atoms per molecule at a temperature of about 90° C. to 100° C., and separating the resulting liquid phases to recover a solution of said sodium alkyl sulfate containing said alcohol and having at least 40% concentration from the aqueous sodium chloride solution.

6. A process for the production of a concentrated solution of a surface-active sulfonic acid salt having 8 to 25 carbon atoms per molecule from less concentrated aqueous solutions thereof substantially free from inorganic salts which comprises salting out said surface-active salt from the less concentrated substantially inorganic salt-free solution by addition of a water-soluble inorganic salt and from 3% to not more than 10% by weight based on said less concentrated solution of a substantially water-insoluble, polar organic solvent for said sulfonic acid salt, which solvent has at least 6 carbon atoms per molecule, a boiling point above 100° C., and is liquid under the operating conditions, separating the resulting liquid phases at a temperature of at least 50° C. but below the boiling temperature of said polar solvent, and recovering a concentrated solution of sulfonic acid salt containing said polar organic solvent.

7. A process for the production of a concentrated solution of a sodium salt of an alkyl sulfonic acid of 8 to 25 carbon atoms per molecule from an aqueous solution thereof of not more than 25% concentration which is substantially free from inorganic salts which comprises salting out said alkyl sulfonic acid salt from said solution with an added inorganic salt of sodium in the presence of from 3% to not more than 10% by weight based on said solution of a polar organic solvent for said alkyl sulfonic acid salt, which solvent boils above 100° C., is liquid under the operating conditions, and is substantially insoluble in said salt solution, separating the resulting phases, and recovering a solution of said alkyl sulfonic acid salt containing said polar organic solvent and having a concentration of at least 40% by weight.

8. A process for the production of a concentrated solution of a surface-active alkyl aryl sulfonic acid salt from a less concentrated aqueous solution thereof substantially free from inorganic salts which comprises salting out said surface-active salt from the less concentrated substantially inorganic salt-free solution by addition of a water-soluble inorganic salt and from 3% to not more than 10% by weight based on said less concentrated solution of a polar organic solvent for said alkyl aryl sulfonic acid salt, which solvent boils above 100° C., is liquid under the operating conditions, and is substantially insoluble in said salt solution, separating the resulting phases, and recovering a concentrated solution of said alkyl aryl sulfonic acid salt containing said polar organic solvent.

9. A process for the production of a concentrated solution of a sodium salt of a sulfonated hydrocarbon of the benzene series having an alkyl radical of 12 carbon atoms attached to the aromatic nucleus from an aqueous solution thereof of about 10% to 25% concentration which is substantially free from inorganic salts which comprises adding to said aqueous substantially inorganic salt-free solution sodium sulfate and from 3% to not more than 10% by weight of an aliphatic monohydroxy alcohol boiling above 100° C., which alcohol is liquid under the operating conditions and is substantially insoluble in said sodium sulfate solution, maintaining the mixture at 50° C. to 100° C., and separating the resulting phases to recover a solution of said sodium salt of the sulfonated hydrocarbon of the benzene series containing said alcohol and having a concentration of at least 40% by weight.

HENDRIK FREDERIK DAMMERS.

REFERENCES CITED

The following references are of record in the file of this patent:

UNITED STATES PATENTS

| Number | Name | Date |
|---|---|---|
| 525,784 | Helmers | Sept. 11, 1894 |
| 1,474,933 | Humphreys et al. | Nov. 20, 1923 |
| 2,152,163 | Tulleners | Mar. 28, 1939 |
| 2,244,512 | Brandt | June 3, 1941 |
| 2,307,953 | Potter | Jan. 12, 1943 |
| 2,316,719 | Russell | Apr. 13, 1943 |